United States Patent [19]
Mita

[11] Patent Number: 6,009,193
[45] Date of Patent: Dec. 28, 1999

[54] METHOD AND APPARATUS FOR CONVERTING N-VALUE IMAGE TO M-VALUE IMAGE, FOR N<M

[75] Inventor: Yoshinobu Mita, Kawasaki, Japan

[73] Assignee: Canon Kabushiki Kaisha, Tokyo, Japan

[21] Appl. No.: 08/366,379

[22] Filed: Dec. 29, 1994

Related U.S. Application Data

[63] Continuation of application No. 07/700,762, May 15, 1991, abandoned.

[30] Foreign Application Priority Data

| May 16, 1990 | [JP] | Japan | 2-126371 |
| May 16, 1990 | [JP] | Japan | 2-126372 |
| May 16, 1990 | [JP] | Japan | 2-126373 |
| May 16, 1990 | [JP] | Japan | 2-126374 |
| May 16, 1990 | [JP] | Japan | 2-126375 |

[51] Int. Cl.$^6$ ........................................ G06K 9/36
[52] U.S. Cl. ........................... 382/168; 358/455
[58] Field of Search ...................... 382/237, 168, 382/169; 358/455, 458

[56] References Cited

U.S. PATENT DOCUMENTS

| 4,032,977 | 6/1977 | Liao | 358/455 |
| 4,630,125 | 12/1986 | Roetling | 358/458 |
| 4,695,884 | 9/1987 | Anastassiou et al. | 382/169 |
| 4,841,377 | 6/1989 | Hiratsuka et al. | 358/456 |
| 4,926,268 | 5/1990 | Kawamura et al. | 358/458 |
| 4,972,500 | 11/1990 | Ishii et al. | 382/274 |
| 5,027,078 | 6/1991 | Fan | 358/455 |
| 5,125,045 | 6/1992 | Murakami et al. | 382/270 |
| 5,187,592 | 2/1993 | Sugiyama et al. | 358/430 |
| 5,488,672 | 1/1996 | Mita | 382/167 |

*Primary Examiner*—Jon Chang
*Attorney, Agent, or Firm*—Fitzpatrick, Cella, Harper & Scinto

[57] ABSTRACT

An image processing method converts an N-value image into an M-value image (N<M). The method obtains an appearance frequency distribution of M-value image data corresponding to a predetermined N-value pattern around an objective pixel of N-value image data, to which an M-value image (M<N) is converted, for each of N-value patterns different from each other. The method then estimates M-value image data corresponding to a given N-value image on the basis of the appearance frequency distribution.

17 Claims, 11 Drawing Sheets

| -1 | -1 | -1 |
|----|----|----|
| -1 | 8  | -1 |
| -1 | -1 | -1 |

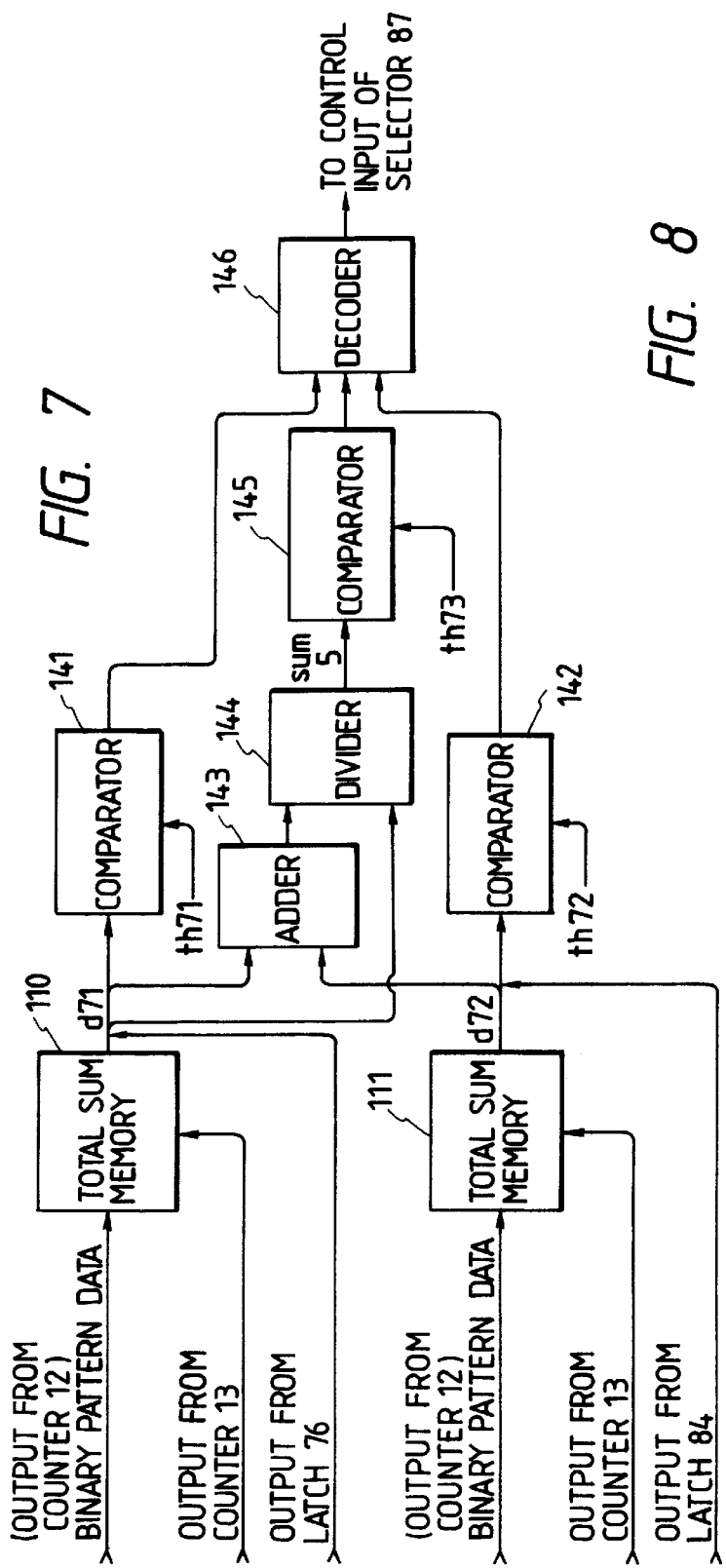

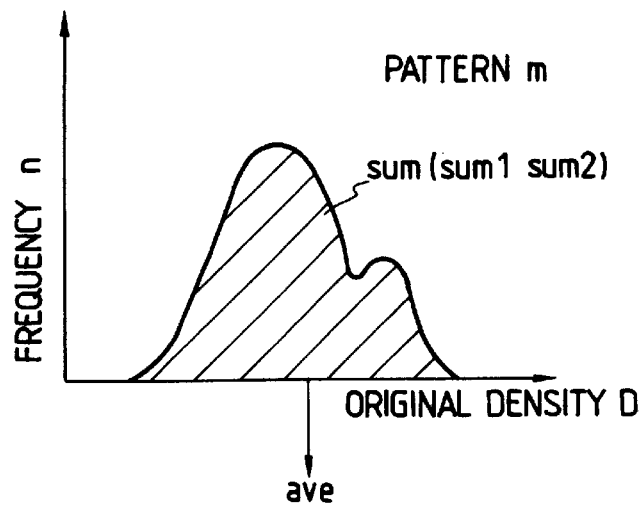
FIG. 14A
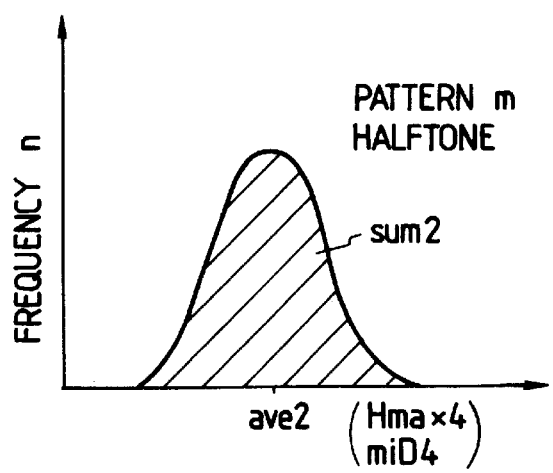
FIG. 14B1
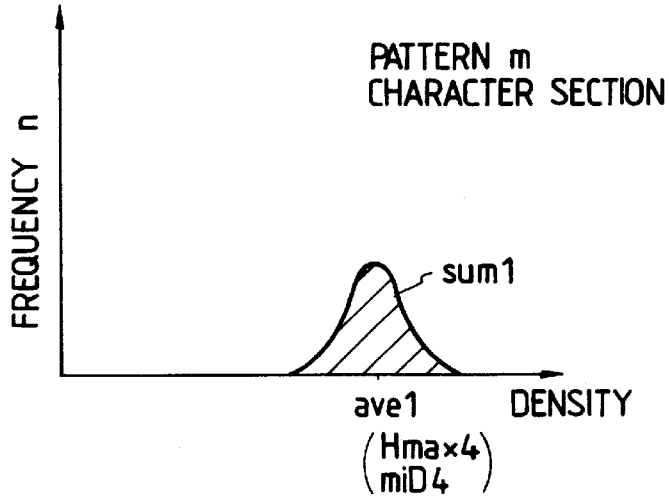
FIG. 14B2

METHOD AND APPARATUS FOR CONVERTING N-VALUE IMAGE TO M-VALUE IMAGE, FOR N<M

This application is a continuation of application Ser. No. 07/700,762, filed May 15, 1991, now abandoned.

BACKGROUND OF THE INVENTION

1. Field of the Invention

The present invention relates to an image processing apparatus for decoding an N-value image to an M-value image (N<M).

2. Related Background Art

As a conventional technique for decoding a binary image to a multivalue image, a technique for smoothing binary data by a smoothing filter to consequently obtain multivalue data is known. For example, if filter coefficients are all "1"s, the number of dots in the filter is directly obtained as multivalue data.

There is also proposed a technique for detecting a pattern of dots of binary data using a rectangular window or a window having another shape, and switching smoothing data in accordance with the detected pattern.

However, according to the conventional multivalue image decoding technique using the smoothing filter, edge sections of characters or line images are blurred, and a completely smooth gradation expression cannot be made in a halftone section. Thus, dot patterns of a binary image often cannot be completely removed.

In the technique for switching smoothing windows for a specific pattern of a binary image, an uneasy or noisy image may be obtained in a boundary section due to an excessive density difference between a switched decoded pixel and surrounding non-switched pixels.

In either technique, it is difficult to perform perfect multivalue image decoding using the smoothing filter. In particular, binary characteristics upon conversion from a multivalue image into a binary image are not taken into consideration at all, and it is difficult to perform good multivalue image decoding.

SUMMARY OF THE INVENTION

The present invention has been made in consideration of the above situation, and has as its object to eliminate the conventional drawbacks.

It is another object of the present invention to provide an image processing method and apparatus capable of performing optimal M-value conversion in consideration of characteristics upon conversion from an M-value image into an N-value image (N<M).

In order to achieve the above objects, according to the present invention, there is disclosed an image processing method of converting an N-value image into an M-value image (N<M), comprising the steps of obtaining an appearance frequency distribution of M-value image data before N-value conversion with respect to a predetermined N-value pattern around an objective pixel of N-value image data obtained by converting an M-value image (M>N) in advance, and 1 estimating M-value image data corresponding to the given N-value image on the basis of the frequency distribution.

It is still another object of the present invention to provide an image processing apparatus capable of performing optimal M-value conversion in consideration of characteristics upon conversion from an M-value image into an N-value image (N<M).

In order to achieve the above object, according to the present invention, there is disclosed an image processing method of converting an N-value image into an M-value image (N<M), comprising the steps of discriminating a feature of an image of an objective pixel for a predetermined N-value pattern around the objective pixel of N-value image data obtained by converting an M-value image (M>N) in advance, obtaining appearance frequency distributions of M-value image data before N-value conversion for N-value patterns in units of features according to the discrimination result, and estimating M-value image data corresponding to the given N-value image on the basis of the frequency distributions.

There is also disclosed an image processing method of converting an N-value image into an M-value image (N<M), comprising the steps of discriminating a nature of an image of an objective pixel for a predetermined N-value pattern around the objective pixel of N-value image data obtained by converting an M-value image (M>N) in advance, obtaining appearance frequency distributions of M-value image data before N-value conversion for N-value patterns in units of features according to the discrimination result, correcting at least one of appearance frequency distributions, and estimating an M-value image corresponding to the given N-value image in accordance with the appearance frequency distributions including the corrected appearance frequency distribution.

According to the present invention, there is disclosed an image processing method comprising the steps of discriminating a feature of an image of an objective pixel for a predetermined N-value pattern around the objective pixel of N-value image data obtained by converting an M-value image (M>N) in advance, obtaining appearance frequency distributions of M-value image data before N-value conversion for N-value patterns in units of features, and estimating the features of the N-value patterns to be converted to M-value data on the basis of these frequency distributions.

It is still another object of the present invention to provide an image processing apparatus which can reproduce a good multivalue image from a binary image.

It is still another object of the present invention to provide an image processing apparatus which can reproduce an image with high image quality.

It is still another object of the present invention to provide an image processing apparatus suitable for high-speed processing.

Other objects and features of the present invention will become apparent from the following description taken in conjunction with the accompanying drawings, and a description of the appended claims.

BRIEF DESCRIPTION OF THE DRAWINGS

FIG. 7 is a partial block diagram of a circuit constituting the seventh embodiment of the present invention;

FIG. 8 shows a decoding table used in the seventh embodiment;

FIGS. 14A, 14B1, 14B2, 14C, 14D, and 14E are distribution charts of appearance frequencies of multivalue image data calculated in the respective embodiments.

DETAILED DESCRIPTION OF THE PREFERRED EMBODIMENTS

Prior to the description of the embodiments, the principle of the present invention will be explained below.

First, an $X_{max} \times Y_{max}$ multivalue image $F(x,y)$ is subjected to binary processing to obtain a binary image $G(x,y)$.

Figure 13:
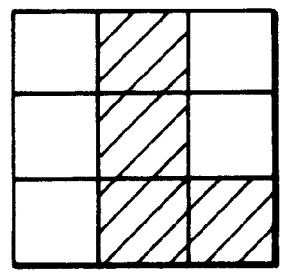
FIG. 13 is a view showing binary pattern data used in the respective embodiments.

Pixels near a given objective pixel $G(xi,yi)$ of the binary image are assumed to be reference pixels, e.g., 3×3 pixels or 5×5 pixels. FIG. 13 shows 3×3 black and white dots near the objective pixel $G(xi,yi)$.

The reference pixel pattern is not limited to a rectangular pattern. If the number of reference pixels is represented by K, there are a total of $2^K$ black and white dot patterns. The $2^K$ patterns are numbered by 0 to $2^K-1$. The binary pattern numbers are obtained for all the combinations of xi and yi of a binary image $G(xi,yi)$, and at the same time, a corresponding multivalue image $F(xi,yi)$ is checked.

An appearance frequency of a given binary pattern m is calculated for all the values of the corresponding multivalue image. Then, decoded data of a multivalue image corresponding to the binary pattern m is determined on the basis of the calculated appearance frequency. This determination is performed for all the $2^K$ binary patterns.

A method of determining multivalue decoded data on the basis of the appearance frequency will be described below.
<Method 1>

FIGS. 14A to 14E are explanatory views showing original densities of a multivalue image for all the binary patterns m.

Figure 14C:
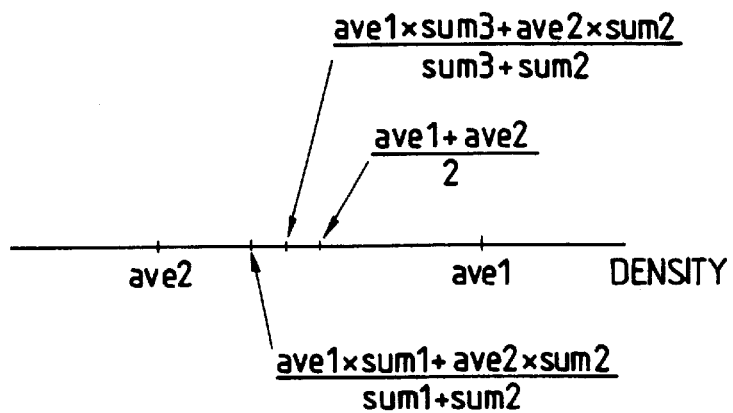
Figure 14D:
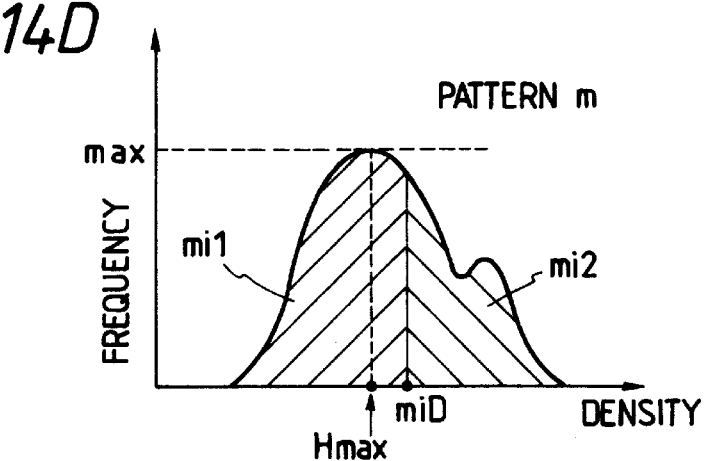

As shown in FIG. 14D, multivalue data Hmax corresponding to a maximum frequency is determined as multivalue decoded data of the binary pattern m.
<Method 2>

As shown in FIG. 14D, a central position miD of the frequency is obtained so that total values mi1 and mi2 on two sides of the central position can satisfy mi1=mi2 for the total of all the frequencies, and the central position is determined as multivalue decoded data of the binary pattern m.

A condition for miD is given by:

$$\int_0^{miD} n(D)dD = \int_{miD}^{D_{max}} n(D)dD$$

<Method 3>

As shown in FIG. 14A, a sum is given by:

$$sum = \int n(D)dD$$

or $$sum = \sum_D n(D)$$

When multivalue data is 8-bit data, D=0 to 255.

After the sum is calculated by the above equation, ave is calculated by the following equation, and is determined as multivalue decoded data of the binary pattern m:

$$ave = \int n(D) \cdot DdD / sum$$

or $$ave = \left\{ \sum_D n(D) \cdot D \right\} / sum$$

The position ave indicates the barycentric position of a histogram of multivalue data for the binary pattern m.
<Method 4>

Before a frequency distribution of a multivalue image $F(xi,yi)$ is obtained for all the combinations of xi and yi of a binary image $G(xi,yi)$, whether or not an image at position $(xi,yi)$ corresponds to an edge section of, e.g., a character, a line image, or the like is discriminated based on the multivalue image $F(xi,yi)$ or the binary image $G(xi,yi)$. If the image at the position $(xi,yi)$ corresponds to the edge section, a frequency of a histogram for the edge section is updated; otherwise, a frequency of a histogram for a halftone section is updated.

In this manner, as shown in FIGS. 14B1 and 14B2, two different halftone image histograms for binary image patterns in edge and halftone sections of an image are prepared.

Whether the image at the position $(xi,yi)$ corresponds to an edge section of a character, or a halftone section may be discriminated on the basis of edge detection using a Laplacian filter, or a frequency distribution may be obtained using an image in which character and halftone sections are separated in advance.

Alternatively, after a frequency distribution is obtained using only a halftone image, frequency distributions in character and edge sections may be obtained using an image consisting of only character and edge sections.

In this case, there are some methods of decoding the binary image pattern m to a multivalue image.
<Method 4-1>

As shown in FIG. 14C, ave=(ave1+ave2)/2 is calculated using a barycenter ave1 of a histogram of an edge section of the pattern m, and a barycenter ave2 of a histogram of a halftone section, and is determined as multivalue decoded data of the pattern m.
<Method 4-2>

The position ave is calculated as follows using a barycenter ave1 of a histogram of an edge section of the pattern m, and a barycenter ave2 of a histogram of a halftone section, and is determined as multivalue decoded data:

(ave1×sum1+ave2×sum2)÷(sum1+sum2)=ave

In this case, the same result as that obtained by <Method 3> described above can be obtained.

This can be apparent from:

$$sum1 + sum2 = sum$$

$$ave1 \times sum1 + ave2 \times sum2 = \sum_n n(D) \cdot D$$

<Method 5>

Total sums Σsum1 and Σsum2 of sum1 and sum2 from the binary pattern 0 to the binary pattern ($2^K-1$) are calculated. When Σsum1 and Σsum2 do not coincide with each other, since the total sums of edge pixels and halftone pixels do not coincide with each other upon formation of histograms, the histograms are unbalanced.

The frequency of the histogram of an edge section is corrected to obtain the same effect as in normalization. More specifically, the same effect as in a case wherein it is assumed that edge and non-edge portions appear at the same frequency is obtained.

Note that a correction value is given by:

sum3=sum1×(Σsum2/Σsum1)

<Method 5-1>

Like in <Method 4-2> described above, ave3 is calculated as follows using the correction value sum3, and is determined as multivalue data:

(ave1×sum3+ave2×sum2)/(sum3+sum2)=ave3

Figure 14E:
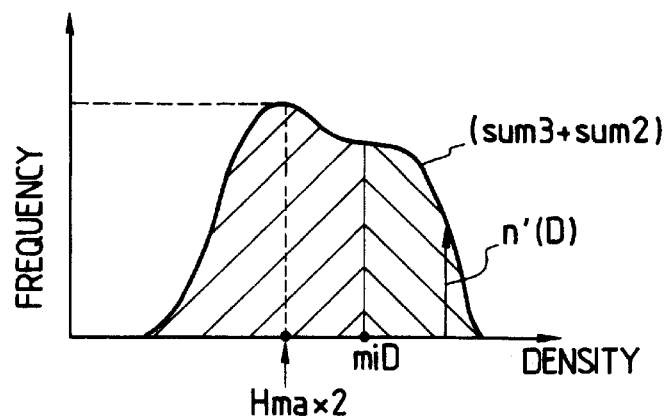
Figure 14C:
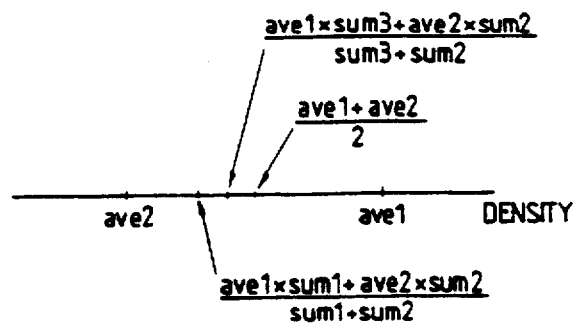
Figure 14D:
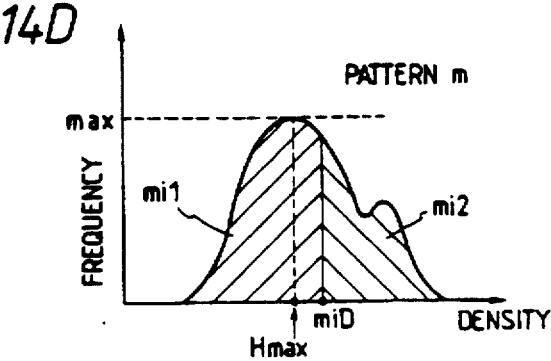
Figure 14E:
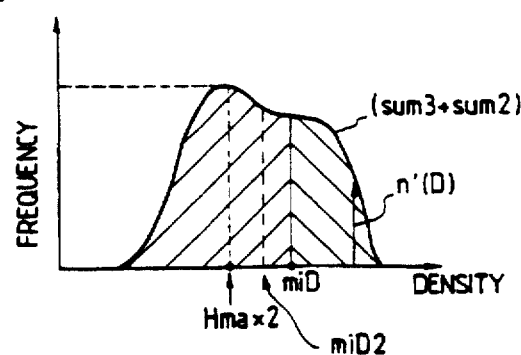

Therefore, in this case, when the histogram of the binary pattern m corresponds to FIG. 14A, and the histograms of the character and halftone sections of the pattern m respectively correspond to FIGS. 14B1 and 14B2, the same effect as in a case wherein these histograms are corrected to a histogram shown in FIG. 14E, and its barycenter is calculated can be obtained.

<Method 5-2>

Based on the histogram shown in FIG. 14E, a maximum value $H_{max}2$ of the frequency is determined as multivalue decoded data.

<Method 5-3>

Based on the histogram shown in FIG. 14E, mid2 is calculated as follows:

$$\int_0^{miD2} n(D)d(D) = \int_{miD2}^{D_{max}} n(D)dD$$

Total frequency values on two sides of mid2 are equal to each other. This mid2 is determined as multivalue decoded data of the binary pattern m.

<Method 5-4>

One of ave1 and ave2 obtained from the histograms of character and halftone sections shown in FIGS. 14B1 and 14B2 is selected, and is determined as multivalue decoded data.

<Method 5-5>

Both ave1 and ave2 obtained from the histograms of character and halftone sections shown in FIGS. 14B1 and 14B2 are used, and are switched in accordance with whether a multivalue decoded pixel corresponds to an edge or halftone section.

The positions ave1 and ave2 are not limited to the barycenters of the histograms like in<Method 3> described above, but may be obtained based on the maximum value $H_{max}$ in <Method 2> or <Method 1>.

<Method 5-6>

In <Method 5-1> to <Method 5-3>, ave1 and ave2 are replaced with values obtained by <Method 2> or <Method 1>, i.e., $H_{max}$ (histogram maximum value) and miD (histogram central value), thereby obtaining multivalue decoded data shown in FIG. 14C.

<Method 6>

In switching, i.e., image area separation in <Method 5-5> described above, an edge section is discriminated based on appearance frequencies of sum1 and sum2, or sum3 and sum2 shown in FIGS. 14B1 and 14B2.

In the binary pattern m, first, sum1 or sum3 is equal to or larger than a predetermined threshold value, and has a given appearance frequency or higher, second, sum2 is equal to or smaller than the predetermined threshold value, and third, sum1/(sum2+sum1) or sum2/(sum2+sum3) is equal to or larger than the predetermined threshold value.

If all or some of these three conditions are satisfied, a character or edge section is determined.

Embodiments as applications of the above-mentioned methods will be described hereinafter.

<First Embodiment>

Figure 1A:
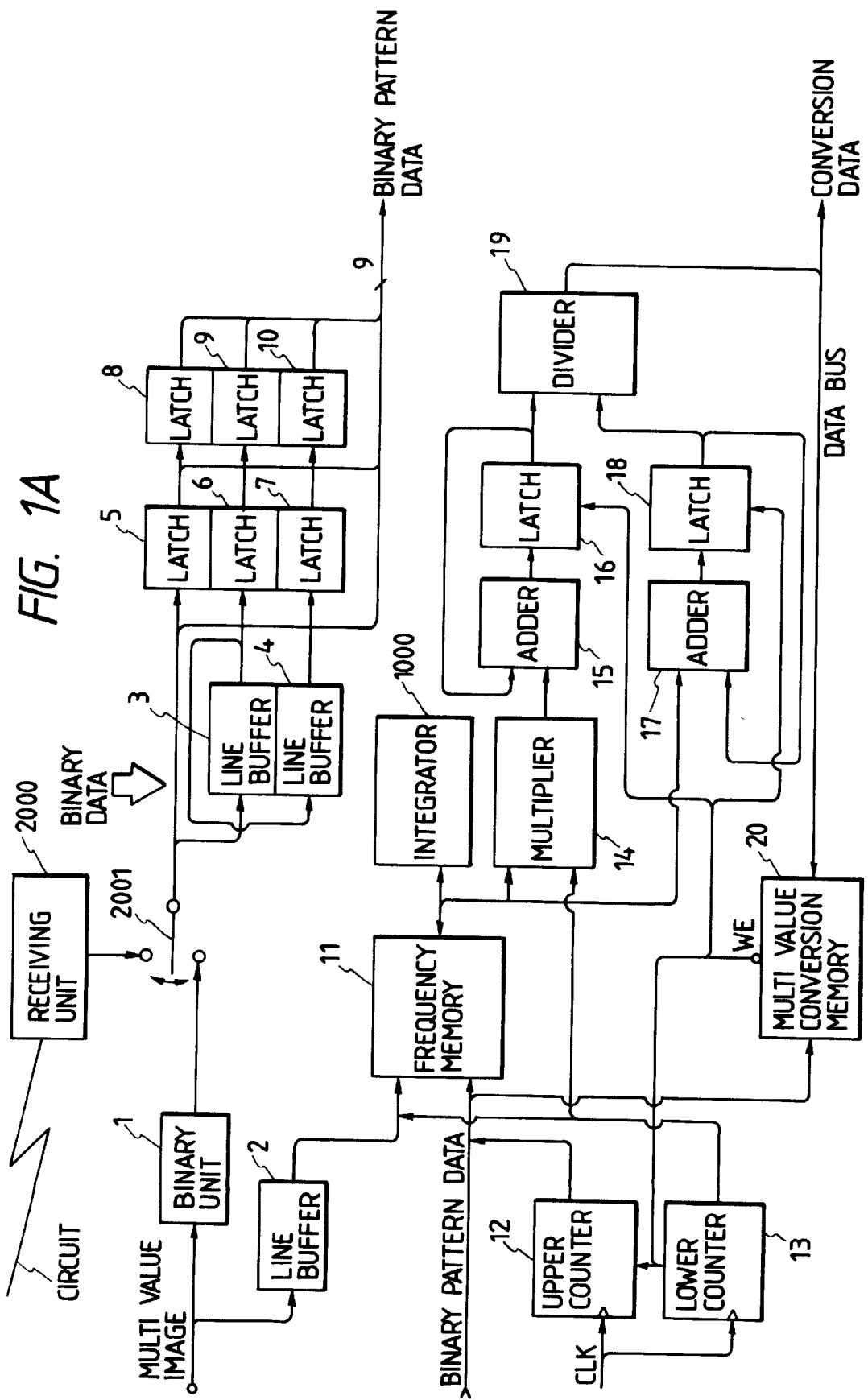
FIG. 1A is a block diagram showing the first embodiment of the present invention.

FIG. 1A is a block diagram showing a circuit arrangement for realizing <Method 3> described above. In this embodiment, a case will be exemplified wherein K=9.

Multivalue image data input from an input terminal is input to a binary unit 1, and is binarized. At the same time, the multivalue image data is also input to a line buffer 2, and is delayed by one line.

Binary data output from the binary unit 1 is input to a line buffer 3, and is delayed by one line. The delayed binary data is then input to a line buffer 4, and is further delayed by one line, i.e., delayed by a total of two lines.

In this manner, binary data for a total of three lines, i.e., real-time binary data, binary data delayed by one line, and binary data delayed by two lines, are latched by latches 5 to 7, and are respectively delayed by one pixel.

The output from each of the laches 5 to 7 is further delayed by one pixel by a corresponding one of latches 8 to 10. Thus, binary pattern data of a continuous 3×3 pixel region are input to a frequency memory 11, and a multivalue conversion memory 20.

In a normal multivalue decoding operation of this apparatus, i.e., when binary image data is decoded to multivalue image data, since there is no original multivalue image, input/output operations of the binary unit 1 are disabled. Instead, binary image data to be decoded is supplied to the multivalue conversion memory 20, and multivalue decoding is performed by the multivalue conversion memory 20, thus obtaining multivalue conversion data.

For example, the apparatus shown in FIG. 1A has an arrangement for multivalue-decoding binary data received by a receiving unit 2000 from a circuit. In a multivalue decoding operation, a switch 2001 is set at the receiving unit 2000 side, and binary data received from the circuit is input to the multivalue conversion memory 20 via the line buffers 3 and 4, and the latches 5 to 10. An input path of binary data to be multivalue-decoded is not limited to the circuit. For example, binary data may be input from a storage medium such as a floppy disk. In an apparatus shown in FIG. 2A (to be described later), although binary data is input in the same manner as in the apparatus shown in FIG. 1A, an input path is not shown for the sake of simplicity.

A process for writing data for performing the multivalue decoding operation in the multivalue conversion memory 20 in advance will be explained below.

When multivalue image data is input to the binary unit 1, the frequency memory 11 receives multivalue image data delayed by one line and one pixel by the line buffer 2 as well as the above-mentioned binary pattern data.

All the memory addresses of the frequency memory 11 are accessed by counters 12 and 13 before this operation, and data "0" is written.

In this state, in the frequency memory 11, an address indicating a frequency of a multivalue image corresponding to the binary pattern data is accessed, and frequency data at the accessed address is output. The output from the frequency memory 11 is supplied to an integrator 1000.

Figures 1B, 2B:
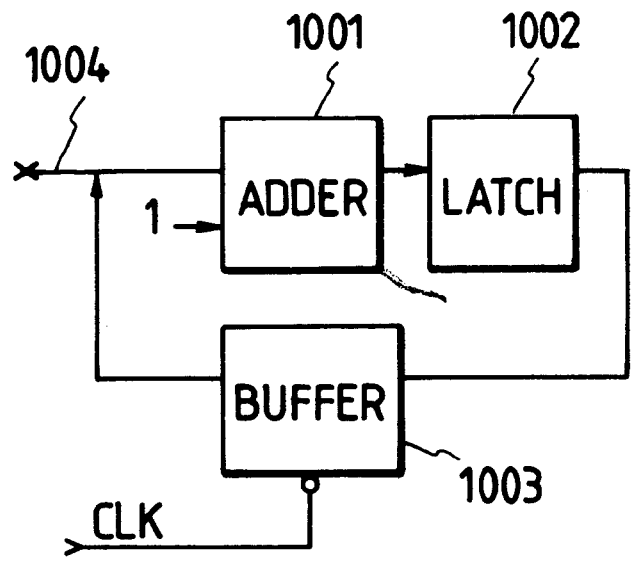
FIG. 1B is a circuit diagram showing an integrator arranged in the first embodiment.
FIG. 2B is a view showing a filter used in the second embodiment.

FIG. 1B is a circuit diagram showing an arrangement of the integrator 1000.

In the integrator 1000, the input (signal line 1004) from the frequency memory 11 is added to 1 by an adder 1001, and the sum is latched by a latch 1002. This operation is performed in the first half of a clock CLK. In the second half of the clock CLK, data held by the latch 1002 is applied to the signal line 1004 by a buffer 1003.

The frequency memory 11 is set in a write mode in the second half of the clock, and data applied to the signal line 1004, i.e., the sum of the frequency and 1 is written in the memory 11.

In this manner, the frequency of multivalue image data corresponding to the 3×3 pixel binary pattern for all the pixels of the input image is formed in the frequency memory 11.

An operation for obtaining a barycenter of a frequency distribution (histogram) of multivalue image data corresponding to $2^K$ (K=9) different binary patterns, and supplying the barycenter to the multivalue conversion memory 20 will be described below.

The counters 12 and 13 sequentially count up to supply addresses to address inputs of $2^K$ different histograms stored in the frequency memory 11.

The output from the counter 13 coincides with the number of bits of a multivalue image, and has 8 bits in this embodiment.

The counter 12 is incremented by one in response to a carry output from the counter 13, and its output has K bits (K=9).

The counter 13 sequentially counts up from 0 to 255. In accordance with this count-up operation, a multiplier 14 multiplies a frequency as the output from the frequency memory 11 with the output from the counter 13.

Thus, a calculation of n(D)·D in <Method 3> described above is completed.

The output from the multiplier 14 is added to the output from a latch 16 by an adder 15. Note that the latch 16 is cleared in advance. Since the latch 16 performs a latch operation in synchronism with the counter 13, the adder 15 finally outputs Σn(D)·D, and this output is latched by the latch 16.

The output from the frequency memory 11 is simultaneously input to an adder 17. The output from the adder 17 is output to a latch 18. The latch 18 is cleared in advance like in the latch 16, and repeats a latch operation in synchronism with the counter 13. Thus, the adder 17 adds the outputs from the latch 18, thereby finally obtaining Σn(D)=sum.

When the counter 13 counts up to a maximum of 255, a carry signal is output, and at the same time, the outputs from the latches 16 and 18 are supplied to a divider 19. The divider 19 performs a division given by:

ave={Σn(D)·D}/sum

The output from the divider 19 is written from a data input/output line in the multivalue conversion memory 20 in synchronism with the carry signal.

At this time, the address line of the multivalue conversion memory 20 receives the output from the counter 12 in place of the binary pattern. As a result, a barycenter value of a corresponding multivalue image histogram is written in the multivalue conversion memory 20.

Simultaneously with the end of the write access, the latches 16 and 18 are cleared in response to the carry signal from the counter 13, and the value of the counter 12 is incremented by one, thus repeating the same operations.

The above-mentioned operations are repeated $2^K$ times, thereby obtaining multivalue image data corresponding to all the $2^K$ different binary patterns.

<Second Embodiment>

Figure 2A:
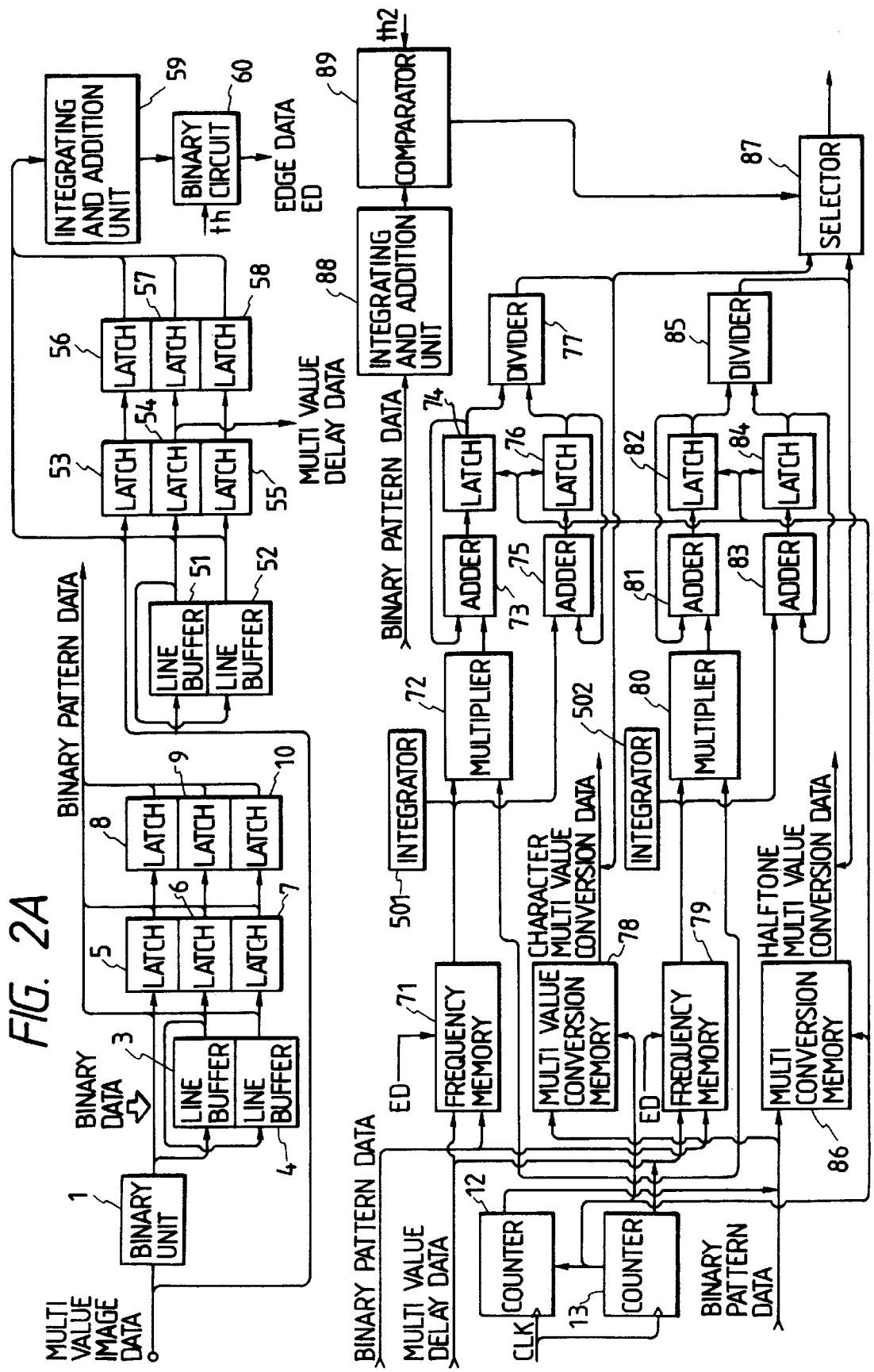
FIG. 2A is a block diagram showing the second embodiment of the present invention.

FIG. 2A is a block diagram showing a circuit arrangement for realizing <Method 5-5> described above.

A description of an arrangement for performing the same operations as in FIG. 1 will be omitted.

Input multivalue image data is converted into binary pattern data via a binary unit 1, latches 5 to 10, and line buffers 3 and 4, and is also input to a line buffer 51, a latch 53, and an integration and addition unit 59.

The line buffer 51 delays the input data by one line. The output from the buffer 51 is input to the integration and addition unit 59 and a latch 54, and is also input to a line buffer 52 to be further delayed by one line.

In this manner, multivalue image data for three vertical lines are input to the integration and addition unit 59, and latches 53 to 55.

Each of the latches 53 to 55 delays the multivalue image data by one pixel, and outputs the delayed data to a corresponding one of latches 56 to 58, and also to the integration and addition unit 59.

Each of the latches 56 to 58 delays the multivalue image data by one pixel, and supplies its output to the integration and addition unit 59.

In this manner, the integration and addition unit 59 receives multivalue image data of continuous 3×3 pixels. The integration and addition unit 59 performs a spatial filtering operation such as a linear or quadratic differentiation, or a Laplacian transformation.

More specifically, each multivalue image data is multiplied with coefficients shown in FIG. 2B, and the products are added to each other.

As a result of such an arithmetic operation, the multivalue image data is input to a binary circuit 60. The binary circuit 60 calculates an absolute value of the input value, and then compares the absolute value with a threshold value th. If the absolute value exceeds the threshold value th, the binary circuit 60 outputs "1"; otherwise, it outputs "0". This output will be referred to as edge data ED hereinafter. The output from the latch 54 is delayed by one line and one pixel, and corresponds to the position of a central pixel (to be referred to as an objective pixel hereinafter) of binary pattern data.

The edge data ED is input to frequency memories 71 and 79.

When ED="1", the frequency memory 71 is enabled, and the frequency memory 79 is disabled. When ED="0", the frequency memory 71 is disabled, and the frequency memory 79 is enabled.

The frequency memories 71 and 79 perform the same operation as the frequency memory 11 except for the above limitation.

Integrators 501 and 502 are the same as integrator 1000 shown in FIG. 1B.

The frequency memory 71 or 79 increments the frequency of multivalue image data for binary pattern data only when it is enabled, and does not perform this operation when it is disabled.

When multivalue image data is supplied to the apparatus of this embodiment, a multivalue image frequency distribution for $2^K$ patterns (K=9) when ED=1 can be obtained on the frequency memory 71 by the integrators 501 and 502. In the frequency memory 79, the frequency is updated by the integrator 502 only when ED=0, and a multivalue image frequency distribution for ED=0 can be obtained.

Since the edge data ED is a signal indicating an edge section of a character or a line image, histograms of multivalue image data corresponding to binary patterns in an edge section and a non-edge section, i.e., a halftone section can be obtained in this manner, and two histograms for the binary pattern m can be obtained, as shown in FIGS. 14B1 and 14B2.

An operation for determining multivalue decoded data for binary pattern data from the histograms obtained in this manner, and writing the data in multivalue conversion memories 78 and 86 will be described below.

In a multivalue decoding operation, the multivalue conversion memory 78 receives binary pattern data, and outputs character section multivalue conversion data as corresponding character or edge section decoded data. On the other hand, the multivalue conversion memory 86 outputs halftone section multivalue conversion data in response to the same binary pattern data input.

These multivalue conversion data are generated as follows.

When a counter 13 counts up, its address output is supplied to the address line of the frequency memory 71 in place of the multivalue delayed data.

The address output of a counter 12 is counted up in response to a carry signal from the counter 13, and is supplied to the address line of the frequency memory 71 in place of the binary pattern data.

In response to the input address, the output from the frequency memory 71 is multiplied with the output from the counter 13 by a multiplier 72, thus performing a calculation of n(D)·D.

The data output from the multiplier 72 is added to the output from a latch 74 by an adder 73. In this case, the latch 74 is cleared in advance, and when the counter 13 counts up in synchronism with a clock CLK, the latch 74 performs a latch operation and outputs n(D)·D, and the next n(D)·D from the multiplier 72 and the output from the latch 74 are added to each other by the adder 73, thus finally obtaining Σn(D)·D from the latch 74.

On the other hand, the output from the frequency memory 71 is also input to an adder 75. Since a latch 76 performs the same operation as the latch 74, Σn(D)=sum can be finally output from the latch 76.

A divider 77 performs a division of {Σn(D)·D}/sum, thereby obtaining a frequency distribution of multivalue image data of the binary image pattern m in a character section.

In this case, when a multivalue image is assumed to be a t-bit image, the counter 13 counts 0 to $2^t-1$ (if t=8, $2^t-1=$ 255), and generates a carry signal. In response to this carry signal, the latches 74 and 76 are cleared, and the output {Σn(D)·D}/sum from the divider 77 is written in the multivalue conversion memory 78.

At this time, the address input of the multivalue conversion memory 78 receives the output from the counter 12, and this output indicates a binary pattern m from which a barycenter {Σn(D)·D}/sum is obtained.

The frequency memory 79, a multiplier 80, adders 81 and 83, latches 82 and 84, and a divider 85 perform the same operations as the frequency memory 71, the multiplier 72, the adders 73 and 75, the latches 74 and 76, and the divider 77, respectively.

Therefore, since the frequency memory 79 stores a multivalue image frequency distribution of the binary pattern m in a halftone section of an image, the barycentric position of this frequency distribution graph is written in the multivalue conversion memory 86 as multivalue decoding data for the halftone section.

As described above, when the counter 12 counts up in response to the carry signal from the counter 13, the same operations are repeated for a binary pattern m+1.

Image data in character and halftone sections for all the $2_K$ binary patterns are stored in the multivalue conversion memory 78 and 86.

An operation for multivalue-decoding a binary image in practice will be described below.

In this case, binary image data to be multivalue-decoded is input in place of the output from the binary unit 1 described above. Binary pattern data obtained by the line buffers 3 and 4, and the latches 5 to 10 are supplied to the multivalue conversion memories 71 and 86.

The multivalue conversion memories 71 and 86 respectively output character and halftone section multivalue conversion data as the barycenters of histograms of the input binary pattern data, and the output data are input to a selector 87.

On the other hand, binary pattern data is subjected to the same spatial filtering processing by an integration and addition unit 88 as in the integration and addition unit 59. After an absolute value of the output from the unit 88 is calculated, the absolute value is compared with a predetermined value th2 by a comparator 89 which performs the same operation as the binary circuit 60, thereby outputting a signal indicating an edge section of a character or a line image, or a non-edge section as a halftone section, as a selection signal for the selector 87.

When the selection signal indicates an edge section, the selector 87 selects the output from the multivalue conversion memory 78, and when the selection signal indicates a non-edge section, it selects and outputs the output from the multivalue conversion memory 86.

Therefore, according to the present invention, multivalue decoded data according to a feature (an edge section or a halftone section) of an image can be obtained, and a multivalue image faithful to an original image can be obtained.

<Third Embodiment>

Figure 3:
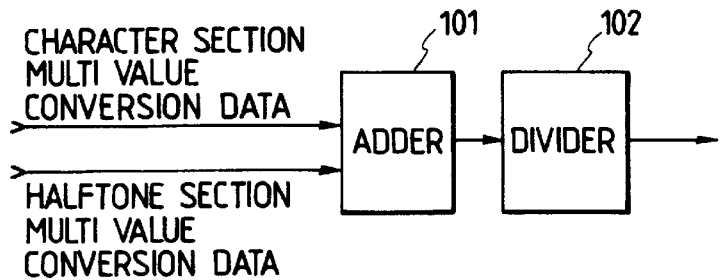
FIG. 3 is a partial block diagram of a circuit constituting the third embodiment of the present invention.

When a circuit shown in FIG. 3 is inserted in place of the selector 87 of the second embodiment, an apparatus for executing <Method 4-1> described above can be obtained.

In FIG. 3, an adder 101 receives character section multivalue conversion data ave1 as an output from the multivalue conversion memory 78, and halftone section multivalue conversion data ave2 as an output from the multivalue conversion memory 86, and adds the input data to each other.

The sum data is multiplied with ½ by a divider 102 to obtain (ave1+ave2)/2, and this quotient serves as multivalue decoded data. More specifically, in this embodiment, the multivalue decoded data has the same value regardless of a character or halftone section.

<Fourth Embodiment>

Figure 4A:
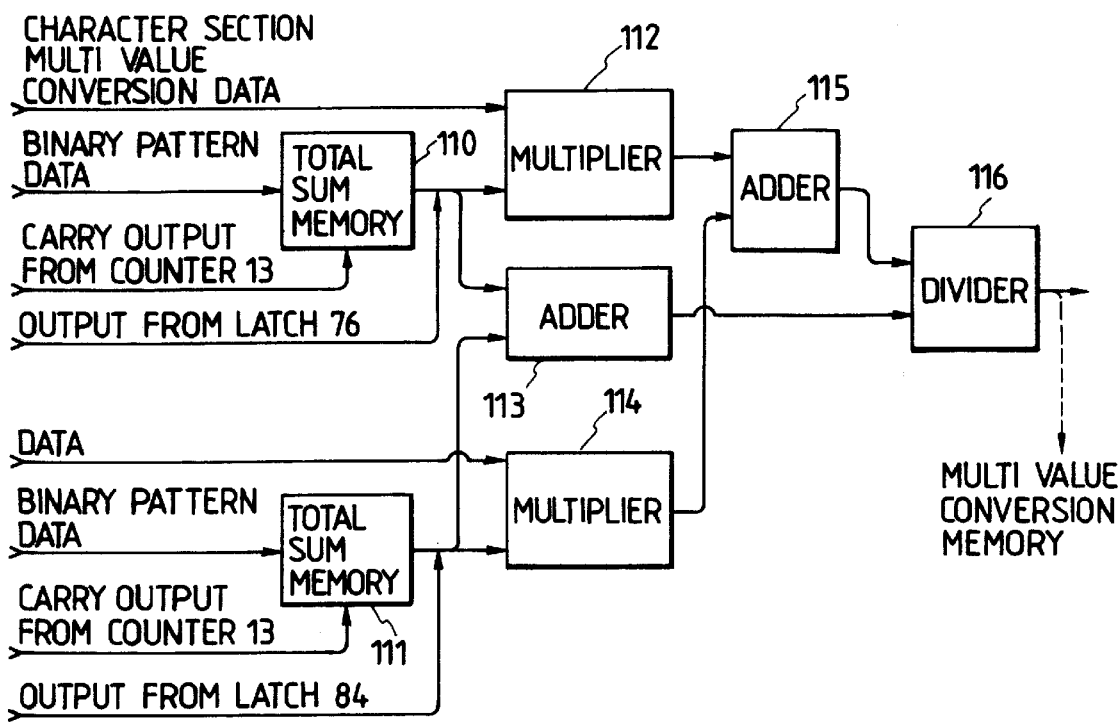
FIGS. 4A and 4B are partial block diagrams of a circuit constituting the fourth embodiment of the present invention.

FIG. 4 is a partial block diagram showing a circuit for realizing <Method 4-2> described above. When this circuit is added to the circuit arrangement shown in FIG. 2A, an apparatus for realizing <Method 4-2> described above can be obtained.

In FIG. 4, total sum memories 110 and 111 perform the same operation as the multivalue conversion memories 78 and 86.

More specifically, when the carry signal is generated by the counter 13, the output from the latch 76 is input to the total sum memory 110. Thus, sum1 shown in FIG. 14B1 in a pattern m is written in the total sum memory 110.

In this manner, when the counter 12 completes its count operation, data sum1 for all the $2^K$ patterns of binary pattern data of a character section is stored in the total sum memory 110.

The total sum memory 111 performs the same operation as the total sum memory 110, and the output from the latch 84 is written in the memory 111 in synchronism with the carry output from the counter 13.

Therefore, sum2 shown in FIG. 14B2, i.e., a total of frequencies for binary pattern data of a halftone section is written in the memory 111.

In this manner, the total sum memories 110 and 111 complete write access at the same timings as the multivalue conversion memories 78 and 86.

A multivalue image decoding operation from a binary image will be described below.

Binary pattern data is supplied to multivalue conversion memories 78 and 86, and character section multivalue conversion data ave1 and halftone section multivalue conversion data ave2 are supplied to multipliers 112 and 114. At the same time, sum1 and sum2 as frequency sums of binary pattern data are also supplied from the total sum memories 110 and 111 to the multipliers 112 and 114.

The multiplier 112 performs a calculation of sum1×ave1, and the multiplier 114 performs a calculation of sum2×ave2.

An adder 115 adds the outputs from these multipliers, and outputs (ave1×sum1+ave2×sum2).

On the other hand, an adder 113 adds sum1 and sum2, and outputs (sum1+sum2).

A divider 116 divides the outputs from the adders 113 and 115, and outputs:

ave=(ave1×sum1+ave2×sum2) /(sum1+sum2)

This quotient serves as multivalue image decoded data.

Figure 4B:
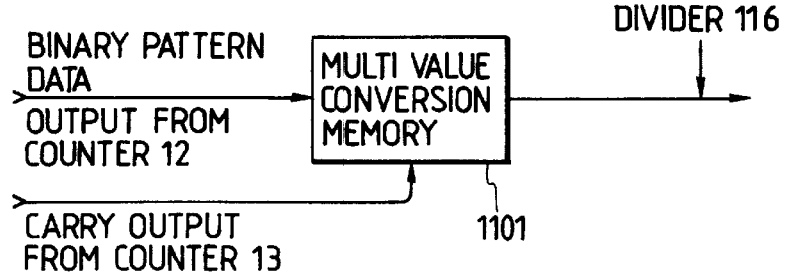

As a means for realizing <Method 4-2>, an arrangement with FIG. 4B in addition to the above embodiment is also available.

In this case, the total sum memories 110 and 111 perform write operations in response to the carry output from the counter 13. At the same time, the output from the divider 77 is supplied as character section multivalue conversion data of the multiplier 112, and the output from the divider 85 is supplied as halftone section multivalue conversion data of the multiplier 114. In addition, the adder 113 receives outputs sum1 and sum2 from the latches 76 and 84, and outputs (sum1+sum2). Thus, the adder 115 calculates (sum1×ave1+sum2×ave2), and the divider 116 outputs (sum1×ave1+sum2×ave2)/(sum1+sum2)=ave. This output is supplied as input data to an input port of a multivalue conversion memory 1101 shown in FIG. 4B.

The address input of the multivalue conversion memory 1101 receives the output from the counter 12, so that multivalue conversion data for a binary pattern data m is written in the memory 1101 in synchronism with the carry output from the counter 13.

These operations are repeated until the counter 12 counts up $2^K$ (K=9) times. As a result, multivalue image decoded data for $2^K$ different binary pattern data are obtained in the multivalue conversion memory 1101.

In this case, in order to obtain multivalue decoded data from binary image data in practice, binary pattern data not from the divider 116 but from the line buffers 3 and 4, and the latches 5 to 10 is supplied to the address input of the multivalue conversion memory 1101, thereby outputting multivalue decoded data from its output port. In this case, therefore, the total sum memories 110 and 111 can be omitted from the circuit arrangement shown in FIG. 4A.

<Fifth Embodiment>

Figure 5:
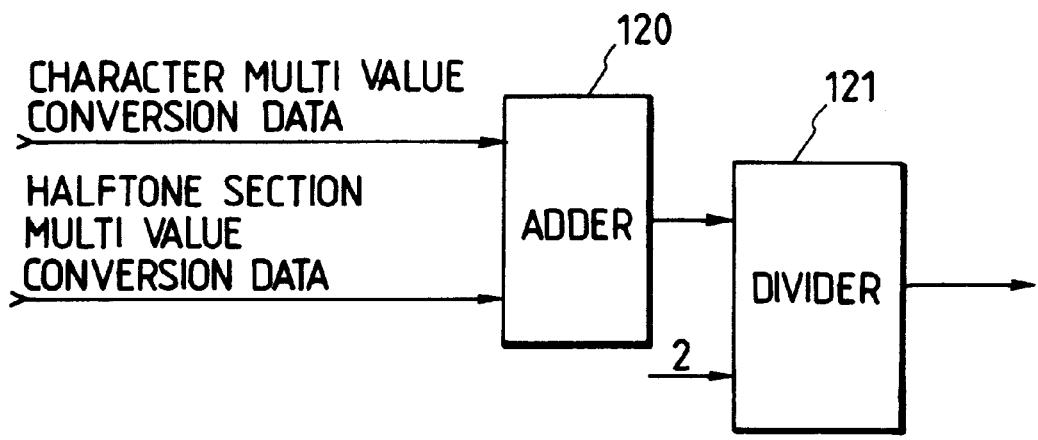
FIG. 5 is a partial block diagram of a circuit constituting the fifth embodiment of the present invention.

FIG. 5 is a partial block diagram of a circuit for realizing <Method 4-1> described above. An apparatus for realizing <Method 4-1> can be obtained by adding the circuit shown in FIG. 5 to the circuit shown in FIG. 2A, and omitting the selector 87, the integration and addition unit 88, and the comparator 89 from the circuit shown in FIG. 2A.

When a binary image is to be decoded to a multivalue image, an adder 120 receives character section multivalue conversion data ave1 and halftone section multivalue conversion data ave2, and adds them to each other.

The sum (ave1+ave2) is divided by 2 by a divider 121 to obtain (ave1+ave2)/2.

<Sixth Embodiment>

Figure 6:
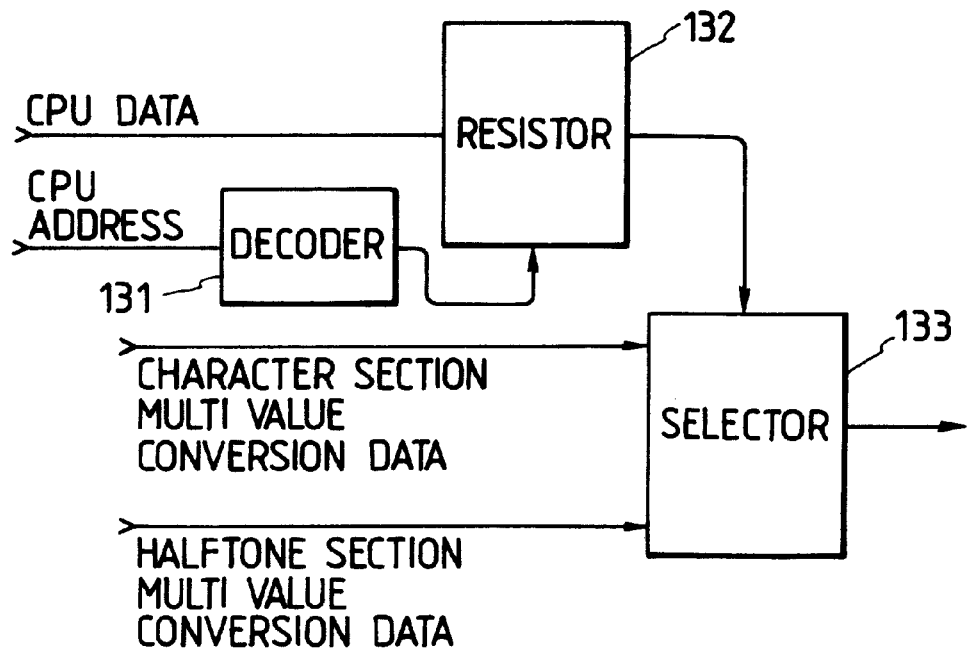
FIG. 6 is a partial block diagram of a circuit constituting the sixth embodiment of the present invention.

FIG. 6 is a partial block diagram of a circuit for realizing the sixth embodiment. The overall circuit arrangement is obtained by connecting the circuit shown in FIG. 6, so that character and halftone section multivalue conversion data as outputs from multivalue conversion memories 78 and 86 are input to a selector 133 shown in FIG. 6.

A selector input for controlling selection in the selector 133 receives an output from a register 132.

The register 132 receives data from a CPU (not shown). More specifically, when the CPU outputs an address for accessing the register 132, a decoder 131 detects this address, and CPU data at that time is latched by the register 132. Based on this data set by the CPU, multivalue image decoding can be performed using character section multivalue conversion data for a character image, and using halftone section multivalue conversion data for a halftone image.

<Seventh Embodiment>

FIG. 7 is a partial block diagram of a circuit for realizing <Method 6> described above.

An apparatus for realizing <Method 6> can be obtained by omitting the integration and addition unit 88 and the comparator 89 from the circuit shown in FIG. 2A, and adding the circuit arrangement shown in FIG. 7 to the circuit shown in FIG. 2A.

FIG. 7 shows a circuit for generating an image area separation signal for instructing which input of the selector 87, i.e., data from the multivalue conversion memories 78 and 86 is to be selected.

Total sum memories 110 and 111 shown in FIG. 7 perform the same operations as the total sum memories 110 and 111 shown in FIG. 4, and store sums sum1 and sum2 of appearance frequencies of character and halftone sections of $2^K$ binary patterns.

An operation for decoding a binary image to a multivalue image will be briefly described below.

The total sum memories 110 and 111 receive binary pattern data m as outputs from the line buffers 3 and 4 and the latches 5 to 10.

Data sum1 (d71) sum2 (d72) of the binary pattern m output from the total sum memories 110 and 111 are respectively input to comparators 141 and 142 and are compared with threshold values th71 and th72. The comparison results are input to a decoder 146.

After an adder 143 calculates sum1+sum2, a divider 144 calculates sum5=sum1/(sum1+sum2), and the output from the divider 144 is compared with a threshold value th73.

These three comparison results are decoded by the decoder 146, and a decoded result is input to the selector 87 as a selection control number. When the output from the decoder 146 is "1", the selector 87 selects character section multivalue conversion data. When the output from the decoder 146 is "0", the selector 87 selects halftone section multivalue conversion data. FIG. 8 shows a truth table of the decoder 146.

As shown in FIG. 8, if sum5>th73, d7>th71, and d72≦th72, then the decoder 146 determines that the input data represents a character section and outputs "1".

That is, for sum1 and sum2 shown in FIGS. 14B1 and 14B2, when sum1 is large and sum2 is small, and when sum1, i.e., the appearance frequency of character patterns is large with respect to sum1+sum2, the binary pattern m is recognized as a character pattern.

<Eighth Embodiment>

Figure 9:
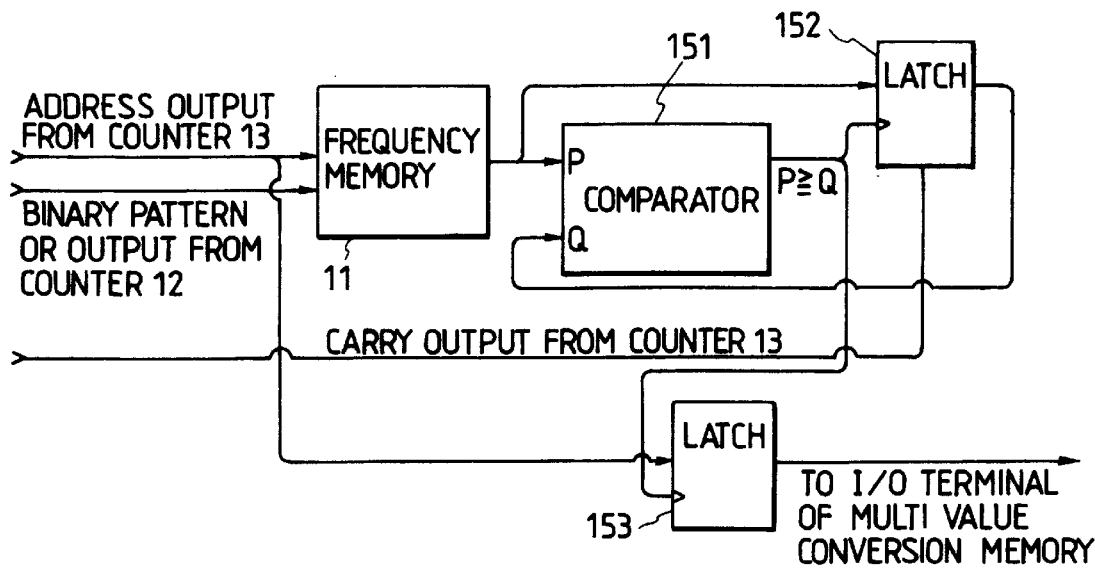
FIG. 9 is a partial block diagram of a circuit constituting the eighth embodiment of the present invention.

FIG. 9 is a partial block diagram for realizing <Method 1> described above. In the eighth embodiment, <Method 1> is realized by omitting the multiplier 14, the adders 15 and 17, the latches 16 and 18, and the divider 19 from the embodiment shown in FIG. 1A, and adding the circuit shown in FIG. 9.

In this embodiment, a description will be started from a state after frequencies of multivalue image data for $2^K$ different binary patterns are written.

A frequency memory 11 receives address output bits from the counter 13, and address output bits from the counter 12. When the counter 13 counts up, the frequency memory 11 outputs a frequency for each multivalue image.

The output from the frequency memory 11 is input to a P input of a comparator 151, and is also input to a latch 152. The latch 152 is cleared in advance, and its output is input to a Q input of the comparator 151. If P≧Q, the comparator 151 outputs a clock to the latch 152 and a latch 153, thus causing them to perform latch operations.

In this case, the latch 152 latches the output from the frequency memory 11, and the latch 153 latches the address output from the counter 13.

When this operation is repeated until the content of the counter 13 reaches a maximum value and the counter 13 generates a carry signal, the latch 152 outputs a maximum frequency of the binary pattern m, and the latch 153 outputs a multivalue image data value $H_{max}$ at the maximum frequency.

This value is $H_{max}$ shown in FIG. 14D. The value $H_{max}$ output from the latch 153 in synchronism with the carry signal generated by the counter 13 is written in the multivalue conversion memory.20.

In this manner, when the counter 13 generates a carry signal, the latch 152 is cleared again, and the counter 12 counts up, thereby similarly obtaining $H'_{max}$ for the next binary pattern m'.

When the counter 12 obtains values $H_{max}$ for all the $2^K$ patterns, all the multivalue decoding data are written in the multivalue conversion memory 20.

In this manner, data for decoding a binary image to a multivalue image can be generated based on input data of a multivalue image.

When a binary image is to be decoded to a multivalue image in practice, binary data is converted to binary pattern data via the line buffers 3 and 4, and the latches 5 to 10, and multivalue decoded data is obtained with reference to the table in the multivalue conversion memory 20 using the binary pattern data.

<Ninth Embodiment>

Figure 10A:
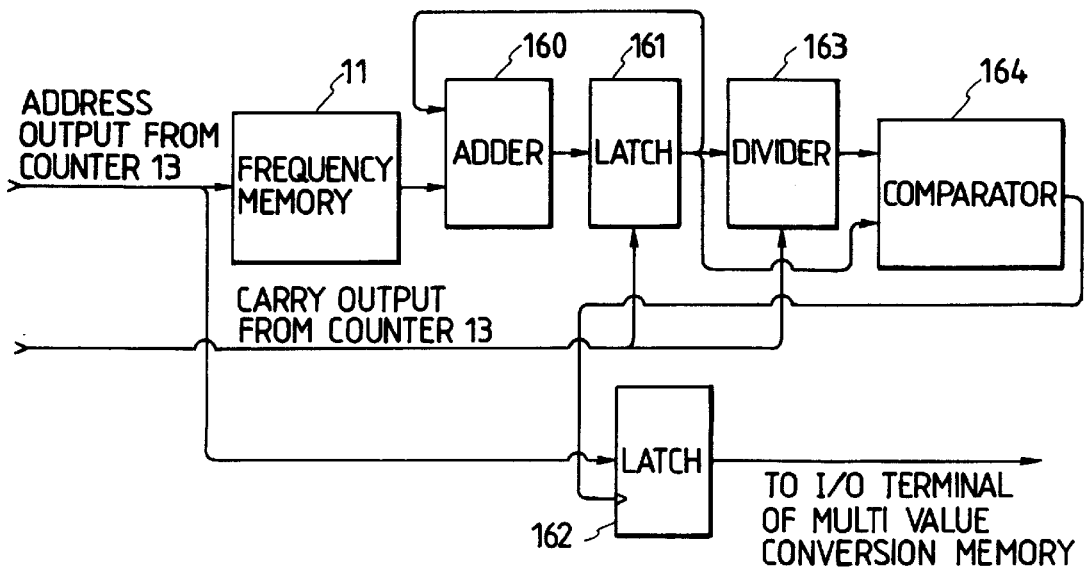
FIGS. 10A and 10B are partial block diagrams of a circuit constituting the ninth embodiment of the present invention.
Figure 10B:
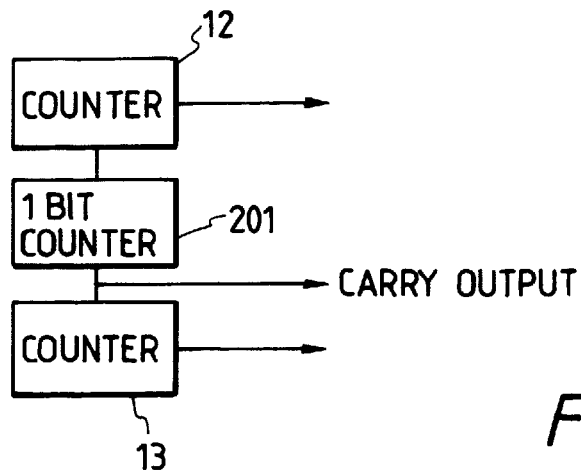

FIGS. 10A and 10B are partial block diagrams of a circuit for realizing <Method 2> described above.

In the ninth embodiment, the multiplier 14, the adders 15 and 17, the latches 16 and 17, and the divider 19 are omitted from the arrangement shown in FIG. 1A, and the arrangement shown in FIG. 10A is added. A 1-bit counter 201 is inserted between the counters 12 and 13, as shown in FIG. 10B.

An operation for generating a multivalue conversion table on the multivalue conversion memory 20 will be explained below.

The operation of the frequency memory 11 is the same as that in the eighth embodiment. More specifically, when the counter 13 counts up, and data is output from the frequency memory 11, the data output from the frequency memory 11 is added to an output from a latch 161 by an adder 160.

The latch 161 is cleared in advance, and repeats a latch operation in synchronism with the count-up operation of the counter 13. When the counter 13 counts up until it generates a carry signal, a sum of all the frequencies of the binary pattern m is stored in the latch 161.

This sum corresponds to an area of a hatched portion shown in FIG. 14D. This area is given by:

$$\sum_{D=0}^{D=D_{max}} n(D)$$

This data is multiplied with ½ by a divider 163, and the quotient is latched.

Since the 1-bit counter 201 is inserted between the counters 13 and 12, even when the counter 13 generates one carry signal, the counter 12 does not count up, and read access from the frequency memory 11 is executed again in synchronism with the count-up operation of the counter 13. The total of frequencies of the pattern m is latched by the latch 161, and the value latched by the latch 161 is compared with Σn(D)/2 latched by the divider 163 by a comparator 164. When a coincidence between the two values is detected, an address output from the counter 13 is latched by a latch 162.

This value is miD shown in FIG. 14D. The value miD corresponds to the central value of the frequency distribution, and is written in the multivalue conversion memory 20 as multivalue conversion data for the binary pattern m in response to the next carry signal from the counter 13. In response to the next carry signal from the counter 13, the 1-bit counter 201 generates a carry signal, and the counter 12 can count up in synchronism with this carry signal.

In this manner, the same operation is repeated until the counter 12 counts addresses for all the $2^k$ binary patterns, and all the multivalue conversion data are finally written in the multivalue conversion memory 20.

<Tenth Embodiment>

Figure 11A:
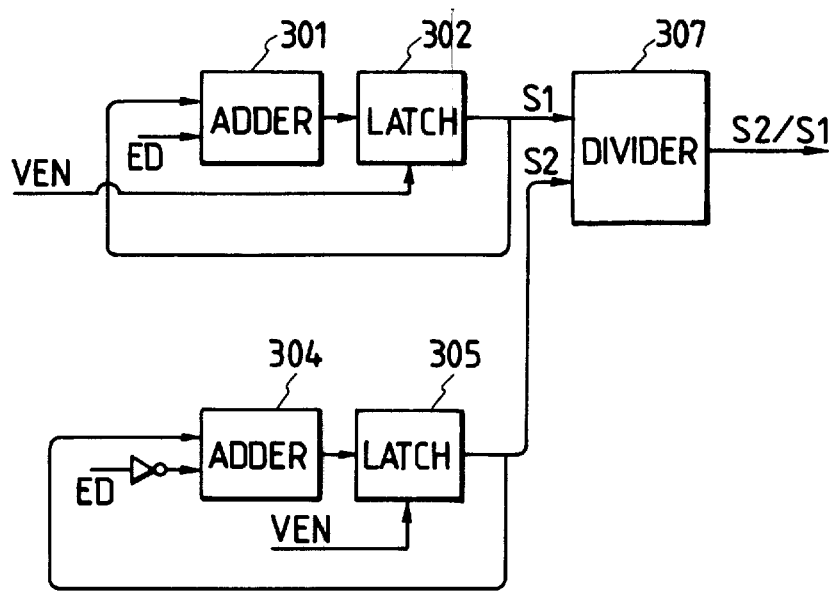
FIGS. 11A and 11B are partial block diagrams of a circuit constituting the tenth embodiment of the present invention.
Figure 11B:
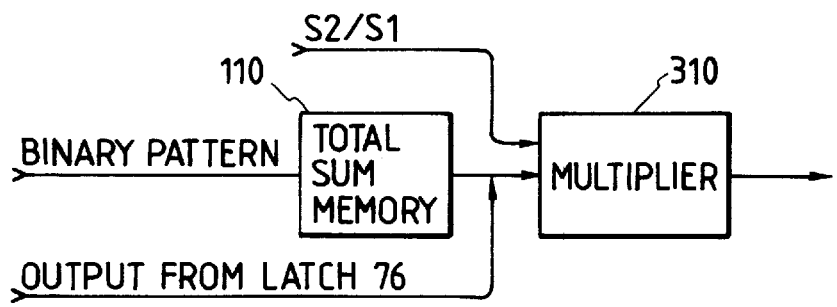

FIGS. 11A and 11B are partial block diagrams of a circuit for realizing <Method 5> described above. The tenth embodiment is constituted by adding the circuit shown in FIGS. 11A and 11B to the circuit arrangement shown in FIG. 2A and the three embodiments using the total sum memory 110 of the embodiments described above.

According to this embodiment, ave2, miD2, and $H_{max}2$ obtained from the frequency distribution shown in FIG. 14E can be calculated, and multivalue conversion can be performed on the basis of these values.

Output data ED from the binary circuit 60 is input to an adder 301, and an inverted signal of the data ED is input to an adder 304.

The output from the adder 301 is latched by a latch 302, and is input to a divider 307. The latch 302 performs a latch operation in response to every clock. Only when multivalue image data is supplied to the binary unit 1, a video enable signal VEN is supplied to the latch 302 to permit its latch operation.

As a result, an appearance frequency Si of an edge section of, e.g., a character in a multivalue image is latched by the latch 302, and an appearance frequency S2 of a halftone section in the multivalue image is latched by a latch 305.

The divider 307 calculates S2/S1. The above-mentioned operations are performed as prescan operations when multivalue image data is loaded.

The tenth embodiment can be applied to all the above-mentioned embodiments using the total sum memory 110. In this case, a multiplier 310 is inserted immediately after the total sum memory 110, as shown in FIG. 11B. The output read out from the total sum memory 110 is multiplied with S2/S1 by the multiplier 310, and this product data is supplied to the respective circuits.

Therefore, when the output from the multiplier 310 is supplied to the multiplier 112 and the adder 113, ave3 shown in FIG. 14E is finally obtained as multivalue decoded data.

When the output from the multiplier 310 is supplied to the comparator 141 and the dividers 143 and 144, image area separation can be performed using sum3 in <Method 6> described above.

Figure 12:
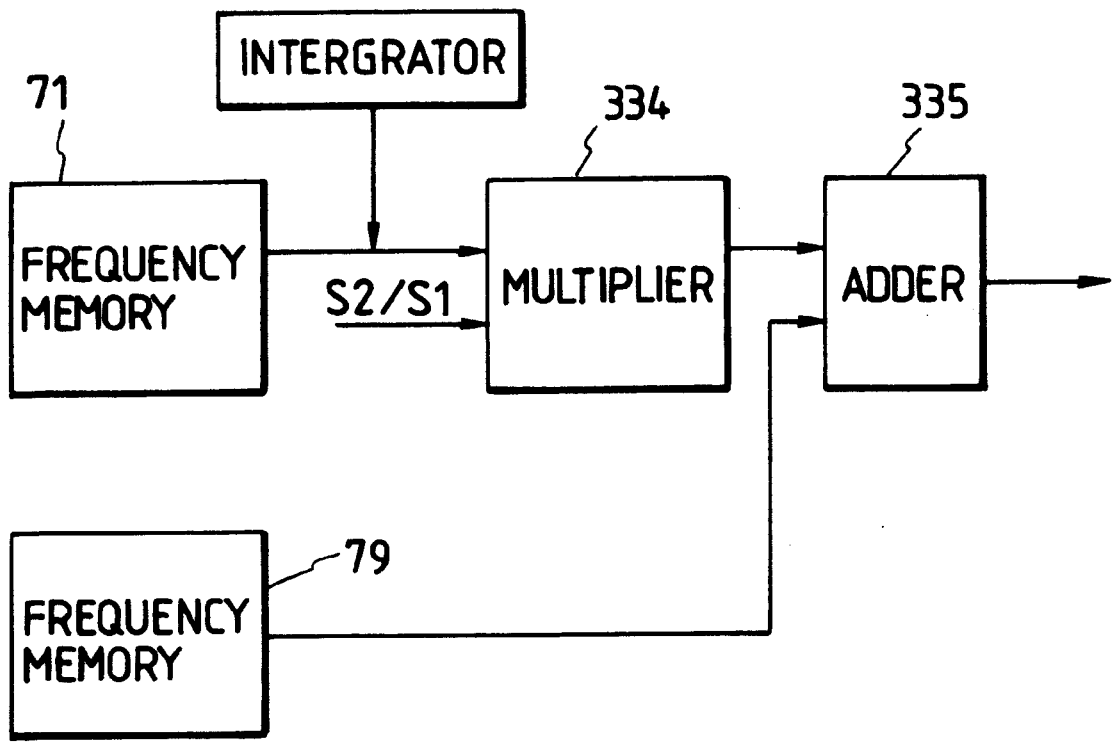
FIG. 12 is a block diagram showing a circuit to be added in the tenth embodiment.

FIG. 12 shows a circuit to be added to the arrangement shown in FIG. 2A when multivalue conversion is performed using $H_{max}2$ and miD2.

As described above, binary pattern image data is stored in the frequency memories 71 and 79 by the prescan operations using the input image data, and the divider 307 can output S2/S1.

An operation for obtaining $H_{max}2$ and miD2 based on the outputs from the frequency memories 71 and 79 and S2/S1 from the divider 307 will be explained below.

When the counter 13 counts up, the output from the frequency memory 71 is supplied to a multiplier 334, and is multiplied with S2/S1. The product is input to an adder 335.

The output from the frequency memory 79 is also input to the adder 335. Thus, the adder 335 outputs a frequency n'(D) of a multivalue density D for the binary pattern m. This is shown in FIG. 14E.

When no frequency distribution correction based on S2/S1 is performed in practice, the frequency to be obtained as shown in FIG. 14D is obtained as shown in FIG. 14E.

When the output from the adder 335 is supplied to the P input of the comparator 151 in the arrangement shown in FIG. 9 from which the frequency memory 11 is omitted, the latch 153 can finally latch $H_{max}2$ shown in FIG. 14E, and $H_{max}2$ is supplied to the multivalue conversion memories 78 and 86 in place of the outputs from the latches 76 and 84. In this case, the selector 87 shown in FIG. 2 can select either input to output $H_{max}2$ according to a binary pattern.

When the output from the adder 335 is supplied to the circuit excluding the frequency memory 11 from the arrangement shown in FIG. 10, the latch 162 can finally latch miD2 shown in FIG. 14E, and miD2 is supplied to the multivalue conversion memories 78 and 86 in place of the outputs from the latches 76 and 84. In this case, the selector 87 shown in FIG. 2 can select either input to output miD2 according to a binary pattern.

The selector 87 may be replaced with the arrangement shown in FIG. 6, so that the selector 133 selects one of the character and halftone section multivalue conversion data. In this case, the output from the latch 153 or 162 may be connected to and written in one of the multivalue conversion memories 78 and 86.

<Modifications>

In the above embodiments, the arrangements for obtaining the barycenter ave given by the following equation of a histogram based on ave1 and ave2, and sum1 and sum2 have been exemplified.

ave=(ave1×sum1+ave2×sum2)

In this case, ave1 and ave2 may be replaced with $H_{max}3$, miD3, $H_{max}4$, and miD4, as shown in FIG. 14B1, upon application of the arrangement shown in FIG. 12 to determine ave.

In this case, $H_{max}$ is a value D at a maximum frequency n(D).

The value miD is a value (central value) for yielding:

$$\sum_{D=0}^{D=miD} n(D) = \sum_{D=miD}^{D=max} n(D)$$

If various binary conversion methods such as an error diffusion method, a dither method, and the like are used in the binary unit 1, multivalue image decoded data suitable for each binary conversion method can be obtained.

As described above, according to each of the above embodiments, a multivalue image is converted to binary data in advance, and an appearance frequency of a multivalue image for the binary data is obtained, thereby estimating multivalue decoded data based on the binary data. Thus, multivalue image decoding can be performed in sufficient consideration of binary characteristics. If a frequency of a character is high in a binary pattern, binary conversion for faithfully reproducing an edge section of, e.g., a character or a line image can be performed. On the other hand, if a frequency of a halftone image is high in a binary pattern, multivalue decoded data for reproducing a smooth halftone section can be obtained.

Therefore, $2^K$ image area separation steps between edge and halftone sections are-executed for all the patterns of a binary image, so that processing equivalent to optimal multivalue decoding for each image area can be executed. As a result, a very good multivalue decoding result can be obtained.

Furthermore, according to each of the above embodiments, optimal multivalue decoded data for a character image, and optimal multivalue decoded data for a halftone image are obtained by independent estimations, and independently estimated data are applied in accordance with an image edge section or a non-edge section. As a result, a smooth halftone section can be reproduced while improving edge preservation characteristics.

When a multivalue decoding table is to be generated, if a total sum of appearance frequencies of edge images in one image frame is different from a total sum of appearance frequencies of halftone images, correction may be made so as to equalize the total sums to those obtained when the edge and halftone images appear at the same frequencies. Thus, multivalue image decoding which does not emphasize one of character and halftone images can be performed.

According to each of the above embodiments, whether or not a binary pattern corresponds to a character section or a halftone section is determined on the basis of a total sum of frequencies of character sections and a total sum of frequencies of halftone sections for each binary pattern, thereby separating image areas. Thus, multivalue conversion using separate multivalue decoded data can be performed in the character and halftone sections. As a result, high-precision separation can be attained without executing image area separation from a binary image using a spatial filter.

In each of the above embodiments, a case has been exemplified wherein binary image data is decoded to a multivalue image. However, the present invention can also be applied to a case wherein three- or four-value image data is decoded to a multivalue image.

According to the present invention, an M-value image is converted to N-value data in advance, and an appearance frequency of an M-value image in the N-value data is obtained, thereby estimating M-value decoded data from the N-value data. Thus, M-value image decoding can be attained in sufficient consideration of N-value conversion characteristics.

The method of decoding a binary image to a multivalue image is particularly effective in a case wherein multivalue image data is converted to binary data at a transmission side, image data is transmitted as the binary data via a digital circuit such as an ISDN or an analog public circuit, and an image is reproduced by a printer capable of forming a multivalue image at a reception side. In this case, since data can be transmitted as binary data on a transmission path, a transmission amount and a transmission time can be decreased, and a multi-gradation image can be reproduced.

The above-mentioned method is effective especially as a function of a reception-side apparatus. For example, the above-mentioned method may be used for generating a table (a ROM, a RAM, or the like) for converting a binary image binarized by a given binary conversion method to a multivalue image.

The tables are prepared in advance in correspondence with a plurality of binary conversion methods, and the reception side may select a proper table in accordance with a binary conversion method used by the transmission side. A technique relating to such table selection is disclosed in U.S. patent application Ser. No. 07/669,587, filed Mar. 14, 1991, now U.S. Pat. No. 5,187,592.

The present invention is not limited to the above embodiments, and various other modifications and applications may be made within the scope of the appended claims.

What is claimed is:

1. An image processing method for converting an N-value image to an M-value image, wherein N<M, said method comprising the steps of:

obtaining an appearance frequency distribution for each of a plurality of different N-value pixel patterns, each appearance frequency distribution representing frequencies of occurrence of a plurality of different M-values; and estimating M-value image data from the N-value image in accordance with the appearance frequency distributions obtained in said obtaining step, wherein said estimating step uses values based on a plurality of peaks when the plurality of peaks exist in a respective appearance frequency distribution.

2. A method according to claim 1, wherein the step of estimating the M-value image data includes the step of estimating M-value image data at a barycenter of a histogram of the frequency distribution.

3. A method according to claim 1, wherein said estimating step includes estimating M-value image data at a maximum frequency of an appearance frequency distribution.

4. A method according to claim 1, wherein the, step of estimating the M-value image data includes the step of estimating M-value image data located at a center of all the frequencies of the frequency distribution.

5. An image processing method for converting an N-value image to an M-value image, wherein N<M, said method comprising the steps of:

discriminating which N-value pixel pattern, among a plurality of different N-value pixel patterns, is disposed around an objective pixel of the N-value image;

obtaining an appearance frequency distribution for each of a plurality of different N-value pixel patterns, each appearance frequency distribution representing frequencies of occurrence of a plurality of different M-values; and estimating M-value image data, in accordance with (i) the N-value image and (ii) the appearance frequency distribution corresponding to the N-value pixel pattern discriminated in said discriminating step, wherein said estimating step uses values based on a plurality of peaks when the plurality of peaks exist in a respective appearance frequency distribution.

6. A method according to claim 5, wherein the feature of the objective pixel indicates whether the objective pixel belongs to an edge or non-edge section.

7. A method according to claim 5, wherein the step of estimating the M-value image data includes the step of estimating M-value image data at a barycenter of a histogram of the frequency distribution.

8. A method according to claim 5, wherein said estimating step includes estimating M-value image data at a maximum frequency of the respective appearance frequency distribution.

9. A method according to claim 5, wherein the step of estimating the M-value image data includes the step of estimating M-value image data located at a center of all the frequencies of the frequency distribution.

10. A method according to claim 5, wherein multivalue conversion is performed based on data estimated in units of features.

11. An image processing method for converting an N-value image to an M-value image, wherein N<M, said method comprising the steps of:

discriminating which N-value pixel pattern, among a plurality of different N-value pixel patterns, is disposed around an objective pixel of the N-value image;

obtaining an appearance frequency distribution for each of the plurality of different N-value pixel patterns, each appearance frequency distribution representing frequencies of occurrence of a plurality of different M-values;

estimating an M-value from each respective appearance frequency distribution; and estimating M-value image data in accordance with the N-value image and the M-value estimated in said step of estimating an M-value, wherein said estimating step uses values based on a plurality of peaks when the plurality of peaks exist in a respective appearance frequency distribution.

12. A method according to claim 11, wherein the nature of the objective pixel indicates whether the objective pixel belongs to an edge or non-edge section.

13. A method according to claim 12, wherein if M-value image decoded values estimated for the edge and non-edge sections are represented by ave1 and ave2, (ave1+ave2)/2 is determined as the M-value image decoded value.

14. A method according to claim 12, wherein if M-value image data estimated values of the edge and non-edge sections are represented by ave1 and ave2, and M-value image total appearance frequencies sum1 and sum2 of the edge and non-edge sections in a given N-value pattern m are represented by sum1 and sum2, an M-value image decoded value for the N-value pattern m is given by (ave1×sum1+ave2×sum2)÷(sum1+sum2).

15. A method according to claim 11, wherein the step of estimating the M-value image decoded values in units of features includes the step of estimating an M-value image value at a barycenter of a histogram of the frequency distribution for each of the features.

16. A method according to claim 11, wherein said estimating step comprises a step of determining an M-value corresponding to a maximum frequency of an appearance frequency distribution.

17. A method according to claim 11, wherein the step of estimating the M-value image values in units of features includes the step of estimating an M-value image value located at a center of all the frequencies of the frequency distribution for each of the features.

* * * * *

UNITED STATES PATENT AND TRADEMARK OFFICE
CERTIFICATE OF CORRECTION

PATENT NO. : 6,009,193
DATED : December 28, 1999
INVENTOR(S) : Yoshinoubu Mita

It is certified that error appears in the above-identified patent and that said Letters Patent is hereby corrected as shown below:

In the Drawing, Figure 14E, should be deleted and replaced with Figure 14E, as shown on the attached page.

Column 1
Line 59, "1" should be deleted.

Column 3
Line 57, "Hmax" should read --$H_{max}$--.

Column 6
Line 24, close up right margin.

Column 10
Line 11, "$2_K$" should read --$2^K$--;
Line 52, "86,.and" should read --86, and--.

Column 13
Line 46, "memory.20." should read --memory 20.--

Column 16
Line 37, "are-executed" should read --are executed--.

Column 17
Line 64, "the," should read --the--.

Column 18
Line 19, "feature" should read --nature--.

UNITED STATES PATENT AND TRADEMARK OFFICE
CERTIFICATE OF CORRECTION

PATENT NO.   : 6,009,193
DATED        : December 28, 1999
INVENTOR(S)  : Yoshinoubu Mita It is certified that error appears in the above-identified patent and that said Letters Patent is hereby corrected as shown below:

Column 19
Line 7, "features" should read --natures--;
Line 9, "features." should read --natures.--.

Column 20
Line 4, "features" should read --natures--;
Line 7, "features." should read --natures.--.

Signed and Sealed this

Fourteenth Day of August, 2001

*Attest:*

NICHOLAS P. GODICI
*Attesting Officer*   Acting Director of the United States Patent and Trademark Office